(12) United States Patent
Templeman et al.

(10) Patent No.: US 9,105,065 B2
(45) Date of Patent: *Aug. 11, 2015

(54) SYSTEMS AND METHODS FOR PROVIDING A BENEFIT PRODUCT WITH PERIODIC GUARANTEED INCOME

(71) Applicant: Genworth Holdings, Inc., Richmond, VA (US)

(72) Inventors: James C. Templeman, Richmond, VA (US); Matthew Sharpe, Richmond, VA (US); Kristi Leighton, Richmond, VA (US); Paul Haley, Richmond, VA (US); Geoffrey S. Stiff, Richmond, VA (US); William S. White, Glen Allen, VA (US)

(73) Assignee: Genworth Holdings, Inc., Richmond, VA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/872,677

(22) Filed: Apr. 29, 2013

(65) Prior Publication Data

US 2013/0317866 A1 Nov. 28, 2013

Related U.S. Application Data

(63) Continuation of application No. 12/434,334, filed on May 1, 2009, now Pat. No. 8,433,634, which is a continuation-in-part of application No. 11/065,441, filed on Feb. 25, 2005, now Pat. No. 8,370,242, which (Continued)

(51) Int. Cl.
*G06Q 40/06* (2012.01)
*G06Q 40/08* (2012.01)

(Continued)

(52) U.S. Cl.
CPC ............... *G06Q 40/08* (2013.01); *G06Q 20/10* (2013.01); *G06Q 40/02* (2013.01)

(58) Field of Classification Search
CPC ........ G06Q 40/08; G06Q 20/10; G06Q 40/02
USPC ............................. 705/30, 36, 36 R, 39, 322
See application file for complete search history.

(56) References Cited

U.S. PATENT DOCUMENTS

| 4,055,757 A | 10/1977 | Tillman et al. |
| 4,742,457 A | 5/1988 | Leon et al. |

(Continued)

FOREIGN PATENT DOCUMENTS

| EP | 0621556 | 10/1994 |
| WO | WO 98/22936 | 5/1998 |

(Continued)

OTHER PUBLICATIONS

"TIAA-CREF Life Introduces Innovative Low-Cost Single Premium Immediate Annuity," Aug. 16, 2001.

(Continued)

*Primary Examiner* — Mary Cheung
(74) *Attorney, Agent, or Firm* — Hunton & Williams LLP

(57) ABSTRACT

A computer implemented method and system that implements a benefit product that provides a guaranteed income amount for a participant, the benefit product generates the guaranteed income amount by participating in a plurality of guaranteed income products (GI products). The system may comprise: (1) an income aggregator portion; (2) a savings recordkeeper portion that maintains an investment account associated with the benefit product, the investment account into which the payments to the benefit product pass; and (3) at least one income recordkeeper portion, each income recordkeeper portion administering one or more GI products, each income recordkeeper portion: determining, based on an attributable allocation to a particular GI product, a guaranteed income associated with such particular GI product, each guaranteed income being an amount, attributable to the particular GI product, that is payable to a participant. The income aggregator performs allocation processing, the allocation processing being performed based on funds transfer data, the funds transfer data including (1) first funds transfer data that reflects activity of the investment account and benefit product associated therewith, and (2) second funds transfer data that reflects activity of a respective GI product.

20 Claims, 7 Drawing Sheets

Related U.S. Application Data is a continuation-in-part of application No. 10/083,250, filed on Feb. 27, 2002, now Pat. No. 8,781,929, which is a continuation-in-part of application No. 09/876,053, filed on Jun. 8, 2001, now Pat. No. 7,398,241.

(51) Int. Cl.
*G06Q 20/10* (2012.01)
*G06Q 40/02* (2012.01)

(56) References Cited

U.S. PATENT DOCUMENTS

| | | |
|---|---|---|
| 4,750,121 A | 6/1988 | Halley |
| 4,876,648 A | 10/1989 | Lloyd |
| 4,969,094 A | 11/1990 | Halley et al. |
| 4,975,840 A | 12/1990 | DeTore et al. |
| 5,291,398 A | 3/1994 | Hagan |
| 5,523,942 A | 6/1996 | Tyler et al. |
| 5,631,828 A | 5/1997 | Hagan |
| 5,655,085 A | 8/1997 | Ryan et al. |
| 5,673,402 A | 9/1997 | Ryan et al. |
| 5,689,649 A | 11/1997 | Altman |
| 5,689,650 A | 11/1997 | McClelland et al. |
| 5,696,907 A | 12/1997 | Tom |
| 5,732,397 A | 3/1998 | DeTore et al. |
| 5,745,706 A | 4/1998 | Wolfberg et al. |
| 5,752,236 A | 5/1998 | Sexton |
| 5,754,980 A | 5/1998 | Anderson et al. |
| 5,806,047 A | 9/1998 | Hackel et al. |
| 5,819,230 A | 10/1998 | Christie et al. |
| 5,864,685 A | 1/1999 | Hagan |
| 5,878,405 A | 3/1999 | Grant et al. |
| 5,893,071 A | 4/1999 | Cooperstein |
| 5,907,828 A | 5/1999 | Meyer et al. |
| 5,911,135 A | 6/1999 | Atkins |
| 5,913,198 A | 6/1999 | Banks |
| 5,926,792 A | 7/1999 | Koppes et al. |
| 5,930,760 A | 7/1999 | Anderton et al. |
| 5,933,815 A | 8/1999 | Golden |
| 5,946,668 A | 8/1999 | George |
| 5,966,700 A | 10/1999 | Gould et al. |
| 5,987,434 A | 11/1999 | Libman |
| 5,995,947 A | 11/1999 | Fraser et al. |
| 5,999,917 A | 12/1999 | Facciani et al. |
| 6,012,043 A | 1/2000 | Albright et al. |
| 6,014,632 A | 1/2000 | Gamble et al. |
| 6,021,397 A | 2/2000 | Jones et al. |
| 6,049,772 A | 4/2000 | Payne et al. |
| 6,052,673 A | 4/2000 | Leon et al. |
| 6,058,376 A | 5/2000 | Crockett |
| 6,064,969 A | 5/2000 | Haskins |
| 6,064,983 A | 5/2000 | Koehler |
| 6,064,986 A | 5/2000 | Edelman |
| 6,071,672 A | 6/2000 | Namba et al. |
| 6,071,673 A | 6/2000 | Iguchi et al. |
| 6,085,174 A | 7/2000 | Edelman |
| 6,235,176 B1 | 5/2001 | Schoen et al. |
| 6,275,807 B1 | 8/2001 | Schirripa |
| 6,282,520 B1 | 8/2001 | Schirripa |
| 6,304,859 B1 | 10/2001 | Ryan et al. |
| 6,343,272 B1 | 1/2002 | Payne et al. |
| 6,473,737 B2 | 10/2002 | Burke |
| 6,584,446 B1 | 6/2003 | Buchanan et al. |
| 6,592,030 B1 | 7/2003 | Hardesty |
| 6,609,111 B1 | 8/2003 | Bell |
| 6,611,807 B1 | 8/2003 | Bernheim et al. |
| 6,611,808 B1 | 8/2003 | Preti et al. |
| 6,611,815 B1 | 8/2003 | Lewis et al. |
| 6,616,180 B2 | 9/2003 | Anderton et al. |
| 6,625,582 B2 | 9/2003 | Richman et al. |
| 6,636,834 B1 | 10/2003 | Schirripa |
| 6,666,768 B1 | 12/2003 | Akers |
| 6,671,677 B2 | 12/2003 | May |
| 6,684,190 B1 | 1/2004 | Powers et al. |
| 6,947,904 B1 | 9/2005 | Macey |
| 6,950,805 B2 | 9/2005 | Kavanaugh |
| 6,963,852 B2 | 11/2005 | Koresko, V |
| 6,999,935 B2 | 2/2006 | Parankirinathan |
| 7,016,871 B1 | 3/2006 | Fisher et al. |
| 7,039,593 B2 | 5/2006 | Sager |
| 7,080,032 B2 | 7/2006 | Abbs et al. |
| 7,089,201 B1 | 8/2006 | Dellinger et al. |
| 7,113,913 B1 | 9/2006 | Davis et al. |
| 7,120,601 B2 | 10/2006 | Chen et al. |
| 7,143,051 B1 | 11/2006 | Hanby et al. |
| 7,149,712 B2 | 12/2006 | Lang |
| 7,249,030 B2 | 7/2007 | Sopko, III et al. |
| 7,249,037 B2 | 7/2007 | Koppes et al. |
| 7,249,077 B2 | 7/2007 | Williams et al. |
| 7,251,623 B1 | 7/2007 | Ryan et al. |
| 7,328,183 B1 | 2/2008 | Leisle |
| 7,376,608 B1 | 5/2008 | Dellinger |
| 7,392,202 B1 | 6/2008 | O'Brien |
| 7,398,241 B2 | 7/2008 | Fay et al. |
| 7,454,379 B1 | 11/2008 | Wolzenski et al. |
| 7,590,583 B1 | 9/2009 | Ferguson et al. |
| 7,613,644 B1 | 11/2009 | Abbs et al. |
| 7,640,202 B2 | 12/2009 | Foti et al. |
| 7,653,560 B2 | 1/2010 | Hueler |
| 7,676,414 B1 | 3/2010 | Abbs et al. |
| 7,685,007 B1 | 3/2010 | Jacobson |
| 7,685,056 B2 | 3/2010 | Menon |
| 7,685,065 B2 | 3/2010 | Weiss et al. |
| 7,689,644 B2 | 3/2010 | Teruyuki et al. |
| 7,698,158 B1 | 4/2010 | Flagg |
| 7,716,075 B1 | 5/2010 | Payne |
| 7,769,664 B2 | 8/2010 | Egan |
| 7,778,907 B1 | 8/2010 | Haskins et al. |
| 7,778,908 B1 | 8/2010 | Grumet |
| 7,797,174 B2 | 9/2010 | Samuels |
| 7,801,792 B2 | 9/2010 | Tatro et al. |
| 7,813,985 B2 | 10/2010 | O'Flinn et al. |
| 7,840,470 B2 | 11/2010 | Robinson |
| 7,840,471 B2 | 11/2010 | Foti et al. |
| 7,853,460 B2 | 12/2010 | Ruark |
| 7,877,306 B2 | 1/2011 | Michalowski et al. |
| 7,877,307 B2 | 1/2011 | Tatro et al. |
| 7,885,832 B2 | 2/2011 | Collins et al. |
| 7,885,834 B2 | 2/2011 | Weiss |
| 7,885,837 B1 | 2/2011 | Martin |
| 7,890,402 B2 | 2/2011 | Golembiewski |
| 8,060,384 B2 | 11/2011 | Landry |
| 8,060,387 B2 | 11/2011 | Landry |
| 8,065,170 B2 | 11/2011 | Weiss |
| 8,095,397 B2 | 1/2012 | Gray et al. |
| 8,095,398 B2 | 1/2012 | Dellinger et al. |
| 8,103,529 B1 | 1/2012 | Liebmann et al. |
| 8,108,298 B2 | 1/2012 | Tatro et al. |
| 8,108,308 B2 | 1/2012 | Buerger |
| 8,112,345 B2 | 2/2012 | Mercier et al. |
| 8,126,746 B2 | 2/2012 | Harris et al. |
| 8,135,598 B2 | 3/2012 | Brown et al. |
| 8,145,509 B2 | 3/2012 | Lange et al. |
| 8,150,715 B1 | 4/2012 | Yee et al. |
| 8,160,902 B2 | 4/2012 | Spalding, Jr. |
| 8,160,946 B2 | 4/2012 | Roche et al. |
| 8,165,902 B2 | 4/2012 | Chien et al. |
| 8,175,900 B2 | 5/2012 | Danielsen |
| 8,175,947 B2 | 5/2012 | Michalowski et al. |
| 8,175,952 B2 | 5/2012 | Brooker et al. |
| 8,175,971 B1 | 5/2012 | Landry |
| 8,180,656 B2 | 5/2012 | Barron, Jr. et al. |
| 8,185,417 B1 | 5/2012 | Brown et al. |
| 8,204,767 B2 | 6/2012 | Dellinger et al. |
| 8,204,816 B2 | 6/2012 | Brodsky et al. |
| 8,209,197 B2 | 6/2012 | Tatro et al. |
| 8,209,199 B1 | 6/2012 | Abbs et al. |
| 8,224,673 B2 | 7/2012 | Michalowski et al. |
| 8,266,055 B2 | 9/2012 | Weiss et al. |
| 8,645,254 B2 | 2/2014 | Castille et al. |
| 8,666,783 B1 | 3/2014 | Meyer |
| 8,682,700 B2 | 3/2014 | Ferguson et al. |

(56) References Cited

U.S. PATENT DOCUMENTS

| | | |
|---|---|---|
| 8,731,976 B1 | 5/2014 | Schuver et al. |
| 8,805,733 B1 | 8/2014 | Hanzlik et al. |
| 8,909,540 B1 | 12/2014 | Greenbaum |
| 2001/0014873 A1 | 8/2001 | Henderson et al. |
| 2001/0034619 A1 | 10/2001 | Sherman |
| 2001/0037276 A1 | 11/2001 | Kelly et al. |
| 2001/0049612 A1 | 12/2001 | Davis |
| 2002/0029158 A1 | 3/2002 | Wolff et al. |
| 2002/0035527 A1 | 3/2002 | Corrin |
| 2002/0052764 A1 | 5/2002 | Banks |
| 2002/0052784 A1 | 5/2002 | Sherwin |
| 2002/0052818 A1 | 5/2002 | Loveland |
| 2002/0059141 A1 | 5/2002 | Davies et al. |
| 2002/0069090 A1 | 6/2002 | De Grosz et al. |
| 2002/0077866 A1 | 6/2002 | Javerlhac |
| 2002/0077868 A1 | 6/2002 | Javerlhac |
| 2002/0087365 A1 | 7/2002 | Kavanaugh |
| 2002/0091539 A1 | 7/2002 | Yin et al. |
| 2002/0103678 A1 | 8/2002 | Burkhalter et al. |
| 2002/0103679 A1 | 8/2002 | Burkhalter et al. |
| 2002/0103733 A1 | 8/2002 | Barrington et al. |
| 2002/0116311 A1 | 8/2002 | Chalke et al. |
| 2002/0138386 A1 | 9/2002 | Maggioncalda et al. |
| 2002/0165740 A1 | 11/2002 | Saunders |
| 2002/0169715 A1 | 11/2002 | Ruth et al. |
| 2002/0184129 A1 | 12/2002 | Arena et al. |
| 2002/0188540 A1 | 12/2002 | Fay et al. |
| 2002/0194098 A1 | 12/2002 | Stiff et al. |
| 2002/0198802 A1 | 12/2002 | Koresko |
| 2002/0198827 A1 | 12/2002 | Van Leeuwen |
| 2003/0004844 A1 | 1/2003 | Hueler |
| 2003/0014285 A1 | 1/2003 | Richard |
| 2003/0014345 A1 | 1/2003 | Lim |
| 2003/0018498 A1 | 1/2003 | Banks |
| 2003/0033172 A1 | 2/2003 | Menke |
| 2003/0055763 A1 | 3/2003 | Linnenbringer et al. |
| 2003/0065539 A1 | 4/2003 | Kay |
| 2003/0088430 A1 | 5/2003 | Ruark |
| 2003/0088512 A1 | 5/2003 | Hoter-Ishay |
| 2003/0093303 A1 | 5/2003 | Pooler |
| 2003/0125982 A1 | 7/2003 | Ginsberg |
| 2003/0135396 A1 | 7/2003 | Javerlhac |
| 2003/0167220 A1 | 9/2003 | Schoen et al. |
| 2003/0172018 A1 | 9/2003 | Chen et al. |
| 2003/0187764 A1 | 10/2003 | Abbs et al. |
| 2003/0191672 A1 | 10/2003 | Kendall et al. |
| 2003/0195827 A1 | 10/2003 | Lichtig |
| 2003/0233301 A1 | 12/2003 | Chen et al. |
| 2004/0078244 A1 | 4/2004 | Katcher |
| 2004/0088201 A1 | 5/2004 | Lang |
| 2004/0088236 A1 | 5/2004 | Manning |
| 2004/0093242 A1 | 5/2004 | Cadigan et al. |
| 2004/0107134 A1 | 6/2004 | Nelson |
| 2004/0111045 A1 | 6/2004 | Sullivan et al. |
| 2004/0117286 A1 | 6/2004 | Charnley, Jr. |
| 2004/0158517 A1 | 8/2004 | Mahaney et al. |
| 2004/0172350 A1 | 9/2004 | Atkinson et al. |
| 2004/0177022 A1 | 9/2004 | Williams et al. |
| 2004/0181436 A1 | 9/2004 | Lange |
| 2004/0199446 A1 | 10/2004 | Lange |
| 2004/0225536 A1 | 11/2004 | Schoen et al. |
| 2004/0249660 A1 | 12/2004 | Williams et al. |
| 2004/0267647 A1 | 12/2004 | Brisbois |
| 2005/0010453 A1 | 1/2005 | Terlizzi et al. |
| 2005/0015282 A1 | 1/2005 | Gutman et al. |
| 2005/0033611 A1 | 2/2005 | Phelps |
| 2005/0033612 A1 | 2/2005 | Donovan et al. |
| 2005/0038681 A1 | 2/2005 | Covert |
| 2005/0038682 A1 | 2/2005 | Gandee et al. |
| 2005/0060251 A1 | 3/2005 | Schwartz et al. |
| 2005/0071205 A1 | 3/2005 | Terlizzi et al. |
| 2005/0080739 A1 | 4/2005 | Sherzan et al. |
| 2005/0080741 A1 | 4/2005 | Sherzan |
| 2005/0144124 A1 | 6/2005 | Stiff et al. |
| 2005/0149425 A1 | 7/2005 | Hagan |
| 2005/0154658 A1 | 7/2005 | Bove et al. |
| 2005/0177509 A1 | 8/2005 | Mahaney et al. |
| 2005/0187840 A1 | 8/2005 | Stiff et al. |
| 2005/0187869 A1 | 8/2005 | Buerger |
| 2005/0216316 A1 | 9/2005 | Brisbois et al. |
| 2005/0234747 A1 | 10/2005 | Kavanaugh |
| 2005/0234821 A1 | 10/2005 | Benham et al. |
| 2006/0026036 A1 | 2/2006 | Mahmood |
| 2006/0041453 A1 | 2/2006 | Clark et al. |
| 2006/0041455 A1 | 2/2006 | Dehais |
| 2006/0059020 A1 | 3/2006 | Davidson |
| 2006/0080148 A1 | 4/2006 | Koresko |
| 2006/0080191 A1 | 4/2006 | Hinson |
| 2006/0085313 A1 | 4/2006 | Selby |
| 2006/0085338 A1 | 4/2006 | Stiff |
| 2006/0143055 A1 | 6/2006 | Loy et al. |
| 2006/0146951 A1 | 7/2006 | Chiu |
| 2006/0149651 A1 | 7/2006 | Robinson |
| 2006/0155631 A1 | 7/2006 | Kondaks |
| 2006/0161461 A1 | 7/2006 | Trani et al. |
| 2006/0206417 A1 | 9/2006 | Selby |
| 2006/0212380 A1 | 9/2006 | Williams et al. |
| 2006/0242052 A1 | 10/2006 | Long et al. |
| 2006/0271411 A1 | 11/2006 | Gregg et al. |
| 2007/0011089 A1 | 1/2007 | DeSchryver |
| 2007/0021986 A1 | 1/2007 | Cheung et al. |
| 2007/0033124 A1 | 2/2007 | Herr et al. |
| 2007/0038481 A1 | 2/2007 | Darr |
| 2007/0038487 A1 | 2/2007 | McCarthy |
| 2007/0050217 A1 | 3/2007 | Holden, Jr. |
| 2007/0061238 A1 | 3/2007 | Merton et al. |
| 2007/0078690 A1 | 4/2007 | Kohl |
| 2007/0094053 A1 | 4/2007 | Samuels |
| 2007/0094054 A1 | 4/2007 | Crabb |
| 2007/0094125 A1 | 4/2007 | Izyayev |
| 2007/0094127 A1 | 4/2007 | Izyayev |
| 2007/0100720 A1 | 5/2007 | Bonvouloir |
| 2007/0100726 A1 | 5/2007 | O'Flinn et al. |
| 2007/0136164 A1 | 6/2007 | Roti et al. |
| 2007/0143199 A1 | 6/2007 | Stiff et al. |
| 2007/0162365 A1 | 7/2007 | Weinreb |
| 2007/0168235 A1 | 7/2007 | Livingston et al. |
| 2007/0185741 A1 | 8/2007 | Hebron et al. |
| 2007/0214022 A1 | 9/2007 | Hagelman, Jr. et al. |
| 2007/0214071 A1 | 9/2007 | Stone |
| 2007/0250427 A1 | 10/2007 | Robinson |
| 2008/0010095 A1 | 1/2008 | Joyce |
| 2008/0021744 A1 | 1/2008 | Walker et al. |
| 2008/0027762 A1 | 1/2008 | Herzfeld et al. |
| 2008/0071661 A1 | 3/2008 | Jeudy et al. |
| 2008/0077450 A1 | 3/2008 | Klippel |
| 2008/0082371 A1 | 4/2008 | Phillips |
| 2008/0103839 A1 | 5/2008 | O'Brien |
| 2008/0109263 A1 | 5/2008 | Clark et al. |
| 2008/0109341 A1 | 5/2008 | Stiff et al. |
| 2008/0133280 A1 | 6/2008 | Ziegler |
| 2008/0154637 A1 | 6/2008 | Capelli et al. |
| 2008/0215376 A1 | 9/2008 | Engelman |
| 2008/0270194 A1 | 10/2008 | West et al. |
| 2008/0270195 A1 | 10/2008 | Gottlieb |
| 2008/0281761 A1 | 11/2008 | Egan |
| 2008/0288297 A1 | 11/2008 | Koo |
| 2009/0030735 A1 | 1/2009 | Tatro et al. |
| 2009/0030736 A1 | 1/2009 | Tatro et al. |
| 2009/0030737 A1 | 1/2009 | Weiss |
| 2009/0030738 A1 | 1/2009 | Golembiewski |
| 2009/0030739 A1 | 1/2009 | Tatro et al. |
| 2009/0030740 A1 | 1/2009 | Robinson |
| 2009/0037231 A1 | 2/2009 | Menke |
| 2009/0063203 A1 | 3/2009 | Baiye |
| 2009/0089104 A1 | 4/2009 | Kondaks |
| 2009/0094069 A1 | 4/2009 | Castille et al. |
| 2009/0094070 A1 | 4/2009 | Harris et al. |
| 2009/0099979 A1 | 4/2009 | Raghavan et al. |
| 2009/0132300 A1 | 5/2009 | Weiss et al. |
| 2009/0132430 A1 | 5/2009 | Weiss |
| 2009/0171831 A1 | 7/2009 | Johnson et al. |
| 2009/0192829 A1 | 7/2009 | Long et al. |
| 2009/0192830 A1 | 7/2009 | Shemtob |

(56) References Cited

U.S. PATENT DOCUMENTS

| | | | |
|---|---|---|---|
| 2009/0271222 | A1 | 10/2009 | Marks et al. |
| 2009/0307016 | A1 | 12/2009 | Gray et al. |
| 2009/0319303 | A1 | 12/2009 | Harkensee et al. |
| 2010/0030583 | A1 | 2/2010 | Fievoli et al. |
| 2010/0030584 | A1 | 2/2010 | Guilbert et al. |
| 2010/0070310 | A1 | 3/2010 | Ferguson et al. |
| 2010/0076792 | A1 | 3/2010 | Mule et al. |
| 2010/0088114 | A1 | 4/2010 | Carstens |
| 2010/0106532 | A1 | 4/2010 | Brown et al. |
| 2010/0121659 | A1 | 5/2010 | Hueler |
| 2010/0125465 | A1 | 5/2010 | Hueler |
| 2010/0131423 | A1 | 5/2010 | Meyer et al. |
| 2010/0138245 | A1 | 6/2010 | Baiye |
| 2010/0145735 | A1 | 6/2010 | Kendall et al. |
| 2010/0169128 | A1 | 7/2010 | Berlin et al. |
| 2010/0169129 | A1 | 7/2010 | Kavanaugh |
| 2010/0174565 | A1 | 7/2010 | Weiss et al. |
| 2010/0185468 | A1 | 7/2010 | Methot |
| 2010/0256995 | A1 | 10/2010 | Oliver |
| 2010/0299160 | A1 | 11/2010 | Roscoe et al. |
| 2011/0035239 | A1 | 2/2011 | Scheinerman et al. |
| 2011/0066453 | A1 | 3/2011 | Tatro et al. |
| 2011/0231211 | A1 | 9/2011 | Griffin |
| 2011/0238453 | A1 | 9/2011 | Roche et al. |
| 2011/0246245 | A1 | 10/2011 | Coleman |
| 2011/0251859 | A1 | 10/2011 | McCullough et al. |
| 2011/0264473 | A1 | 10/2011 | Abreu et al. |
| 2011/0270637 | A1 | 11/2011 | Tatro et al. |
| 2011/0282696 | A1 | 11/2011 | Weiss et al. |
| 2012/0022899 | A1 | 1/2012 | Landry |
| 2012/0072245 | A1 | 3/2012 | Schiminovich |
| 2012/0084104 | A1 | 4/2012 | Harkensee et al. |
| 2012/0095785 | A1 | 4/2012 | Gore et al. |
| 2012/0101857 | A1 | 4/2012 | Harris et al. |
| 2012/0116822 | A1 | 5/2012 | Vasavada et al. |
| 2012/0158435 | A1 | 6/2012 | Sexauer et al. |
| 2012/0209629 | A1 | 8/2012 | Gordon et al. |
| 2012/0209631 | A1 | 8/2012 | Roscoe et al. |
| 2014/0236637 | A1 | 8/2014 | Tan-Torres, Jr. |
| 2014/0257875 | A1 | 9/2014 | Schuver et al. |
| 2014/0278564 | A1 | 9/2014 | Smith et al. |

FOREIGN PATENT DOCUMENTS

| | | |
|---|---|---|
| WO | WO 00/13118 | 3/2000 |
| WO | WO 00/14664 | 3/2000 |
| WO | WO 01/20512 | 3/2001 |
| WO | WO 01/88834 | 11/2001 |
| WO | WO 02/067096 | 8/2002 |
| WO | WO 2004/099943 | 11/2004 |
| WO | WO 2009/074878 | 6/2009 |

OTHER PUBLICATIONS

"Which Types of Insurance Do You Actually Need?" www.thirdage.com, 2006.
"New Variable Annuity Features Provide Value, but at a Cost", Located at http://www.insure.com/life/annuity/newerfeatures.html.
American Express Financial Group Launches Annuities Feature Designed to Help Investors "Fight Off the Bears and Run With the Bulls", Business Wire, May 3, 2005, 2 pgs.
Andrews, Listen Carefully and Sell More Annuities, Life & Health Insurance Sales, Indianapolis, vol. 140, Iss. 6, Nov./Dec. 1997.
Anonymous "The White House: Remarks by the President in Social Security Forum Town Hall meeting—Part 1 of 3" Jul. 28, 1998M2 Presswire , p N/A.
Anonymous, Rep Spotlight: Buddy White NCB Central Carolina Bank, Grenville, SC; Stepping in where half a dozen previous reps had failed, White says he does more teaching than selling across a vast territory, Bank Investment Marketing, p. 14 Jan. 1, 2002.
Brown, et al., "Joint Life Annuities and Annuity Demand by Married Couples", Journal of Risk and Insurance, 67, 4, 527, Dec. 2000.
Customer Action. Understanding Credit Card Costs. Dec. 27, 1996. p. 1-8. As viewed on May 4, 2011 at http://www.consumer-action.org/english/articles/understanding_credit_card_costs_tips_on_reducing_finance.
CYBULSKI "Getting out of Your Annuity," located at http://www.insure.com/life/annuity/basics.html.
CYBULSKI "The Ups and Downs of Immediate Variable Annuities," located at http://www.insure.com/life/annuity/getout.html.
CYBULSKI, "The Basics of Annuities," located at http://www.insure.com/life/annuity/immediate.html.
Debaise, Insurers Add a Twist to Annuity Offerings, The Wall Street Journal. online (www.WSJ.com), Jan. 5, 2006, 4 pgs.
Derivatives R US—Structured Notes, 1995.
Feldman, A. "Can This New 401(k) Save Retirement?," Business Week, Feb. 16, 2009.
Feldstein et al., Accumulated Pension Collars: A Market Approach to Reducing the Risk of Investment-Based Social Security Reform, National Bureau of Economic Research Working Paper 7861, Aug. 2000.
Financial Services Report, vol. 7, No. 10, May 9, 1990, Planco provides marketing services include colonial penn's popular annuity.
Fraser, Short Takes: Discover Brokerage Top 10 Stocks, American Broker, vol. 164 Issue 40 Mar. 1, 1999, 1 pg.
Friedberg, Ruth, Area experts offer advice on making investments work Daily Breeze (Cape Coral, FL, US) s A p. 5 Publication Date: Mar. 8, 1994.
Golden Rule Insurance Company Receives Patent for Its Life/Long-Term Care Insurance Concept, PR Newswire, Jul. 15, 2003, 1 pg.
Griffin, Mark E "The federal income taxation of annuities: A success story" May 1995 Journal of the American Society of CLU & ChFC v49n3 pp. 44-56.
Hogan, 401(k) Provider Offers Guaranteed Income, www.ignites.com, Apr. 14, 2005, 2 pgs.
Huntley, Helen, Compare split annuity's package deal to other investments Series: on Money; [South Pinellas Edition] St. Petersburg Times. St. Petersburg, Fla.: Dec. 29, 2002. p. 3.H.
Ibbotson Seeks Partnerships for Combined Fund, Annuity, Defined Contribution & Savings Plan Alert, Euromoney Institutional Investor PLC, Nov. 10, 2006, 1 pg.
International Search Report dated Dec. 10, 2002 for Application No. PCT/US02/16471.
International Search Report dated May 4, 2004 for Application No. PCT/US03/05696.
Lavine, New York Life Annuity Builds on Two Popular Features: Expects New Product to Attract $200 Million Within a Year, Annuity Market News, Thomson Media Inc. Feb. 1, 2005, 2 pgs.
Lincoln Financial Group Enhances Variable Annuity Option Lincoln SmartSecurity(SM) Advantage to Offers Guaranteed Lifetime Income for Both Investor and Spouse, PR Newswire Association LLC, Nov. 6, 2006, 3 pgs.
Lincoln Financial Group's i4LIFE® Advantage Reaches Milestone as Elections Cross $1.0 Billion in 2006 Sales; Straight Record-Breaking Quarter, PR Newswire Association LLC, Nov. 6, 2006, 3 pgs.
Mason, Tom, Column, Fort Worth Star-Telegram, Texas, Oct. 20, 1998.
McEvoy, Replacing Insurance Policies Can Be Tricky, State Journal Register, Jan. 29, 1995, 2 pgs.
New York Life Brings Longevity Protection to Immediate Annuities: New Option Allows Clients to Customize retirement Payments According to Personal Needs and Life Events, Business Wire, Oct. 6, 2005, 2 pgs.
New York Life Introduces Lifestages ® Elite Variable Annuity, New York Life, Oct. 1, 2003, 3 pages, http://www.newyorklife.com/cda/0,3254,12212,00.html.
New York Life Unveils Lifetime Income Product Featuring Liquidity, Inflation Protection, and Legacy Options, New York Life, 3 pages, http://www.newyorklife.com/cda/0,3254,12346,00.html.
Prudential Introduces Income Bridge Approach to Retirement Planning, Business Wire, Mar. 15, 2004, 1 pg.
Prudential Responds to 'Retirement Revolution' with Innovative, Patent-Pending Guaranteed-Income Product, Business Wire, Dec. 13, 2006, 3 pgs.

(56) References Cited

OTHER PUBLICATIONS

Prudential Retirement Expands Patent-Pending Income Bridge Approach(R) to Help Maximize Social Security Benefits to Retail Clients: New Report Unveiled on Helping to Maximize Social Security Benefits, Business Wire, 2006, 2 pgs.

Rutherford, Dan Retirees Sue Metlife, Ex-Agent in Tulsa, Tulsa World Jun. 11, 1996 03:10 E.T.

Smith et al., Annuity Tax and Planning Considerations, Journal of the American Society of CLU & ChFC, Bryn Mawr, vol. 46, Iss. 1, Jan. 1992.

Tergesen, New Wrinkles for Annuities, BusinessWeek, Jul. 24, 2006, 4 pgs.

Tregarthen, Double the Benefit with a Split Annuity, Life Association News, Washington, vol. 92, Iss. 9, Sep. 1997.

U.S. Appl. No. 09/595,898, filed Jun. 20, 2000.

www.annuityadvisors.com/FAQ/EquityIndexed.asp.

SYSTEMS AND METHODS FOR PROVIDING A BENEFIT PRODUCT WITH PERIODIC GUARANTEED INCOME

RELATED APPLICATIONS

This patent application is a continuation of U.S. patent application Ser. No. 12/434,334, which is a continuation-in-part of U.S. patent application Ser. No. 11/065,441 filed Feb. 25, 2005 and now U.S. Pat. No. 8,370,242, which is a continuation-in-part of U.S. patent application Ser. No. 10/083,250 filed Feb. 27, 2002, which is a continuation-in-part of U.S. patent application Ser. No. 09/876,053 filed Jun. 8, 2001 and now U.S. Pat. No. 7,383,241, all of which are incorporated here by reference in their entirety and to which priority is claimed.

FIELD OF THE INVENTION

The present invention relates generally to systems and methods for providing a user with guaranteed income payments and, more particularly, to systems and methods for guaranteeing those income payments in association with a benefit product.

BACKGROUND OF THE INVENTION

Up until about 1870, more than half of the United States' adult workers were farmers. These adult workers were typically engaged in their occupations until their death or until their health prevented them from continuing their occupations. It was uncommon to have a prolonged retirement period before a worker's death.

After 1870, however, industry developed rapidly and the economy tended increasingly to be characterized by industrialization and urbanization. The result was that workers increasingly were employed in more industry-related jobs and became more dependent upon a continuing flow of monetary income to provide for themselves and their families. Additionally, the average life expectancies of workers began to increase significantly. It became more common for workers to retire from employment and to survive for longer periods of time following their retirements. Retirement programs began to take hold. The Social Security program was introduced in 1935 and had an old age insurance component which provided a lump sum benefit for workers at age 65. At that time, the average life expectancy of a worker was 68. Currently, however, half of male workers reaching age 65 can expect to still be alive at age 82 and half of female workers reaching age 65 can expect to be alive at age 86. The Social Security program is not keeping pace with such changes. The number of employees entering the workforce has been less than the number of new retirees for the last several years and this trend is expected to increase as the "Baby Boomers" age. The Social Security Administration ("SSA") projects a shortfall in its trust fund which provides benefits to retirees beginning in 2013. The SSA believes that an immediate and permanent increase of Social Security payroll taxes is necessary in order to enable it to pay for the full amount of old age benefits it currently provides retirees. Now, employees and employers contribute approximately 12.4 percent of salaries to the Social Security trust fund. The SSA projects that contributions must be increased to at least 38 percent in order for its trust fund to remain fully funded. Therefore, it is becoming increasingly uncertain whether the Social Security program will continue to remain viable until the time that today's workers are ready to retire. Moreover, many retirees have found that the amount of retirement benefits to which they are entitled under the Social Security program is insufficient to enable them to maintain a desired level of comfort in their retirement. They have found a need to supplement such Social Security benefits with income from other sources.

In addition to the institution of the Social Security program in the 1930s, beginning in the early 1900s, it became increasingly more common for employers to provide their workers, or employees, with some sort of retirement benefits or pensions. These retirement benefits or pensions were originally designed, in part, to reward an employee for his/her long career with a company and to help provide an income once such employee retired. Such retirement benefits or pension plans therefore required minimum periods of employment before an employee's entitlement to the pension amount became vested. However, many such retirement benefits or pensions are not portable. In other words, if an employee leaves the employ of an employer, that employee may lose all entitlement to such retirement benefit or pension if the employee terminates his/her employment prior to the expiration of the vesting period. This was not a problem when employers first instituted such retirement benefits or pension plans as employees tended to remain employed with one employer for their entire career until they retired. However, in today's mobile society, employees do not tend to remain employed by one employer for their entire careers. Many employees therefore lose some or all of their projected retirement benefits which may have accrued during their employ by their employers when they leave the employ of such employers.

Furthermore, in addition to the trend of a more mobile society and an increased level of employment changes, many employers are decreasing the numbers of their employees and are instead increasingly turning to non-employee labor in part to cut expenses resulting from employee benefits such as costs related to funding employee retirement plans. Thus, many individuals in the workforce today are technically not considered "employees" but instead are independent contractors for whom employment benefits such as retirement benefits are not provided. Additionally, many employers are ceasing to offer defined benefit plans altogether because of the costs. In fact, according to statistics published by the Pension Benefit Guaranty Corporation, defined benefit pension plans of employers have decreased by more than 60 percent since 1985, with the number of U.S.-based employers that offer such defined benefit pension plans decreasing from 114,000 in 1985 to less than 40,000 in 1999. Only 21.3 percent of working family heads are currently covered by an employer-funded defined retirement benefit or pension plan.

Because of the decrease in the number of employers that offer defined retirement benefit pension plans, the decrease in the number of workers entitled to employer-funded retirement benefits and also because of the increased mobility of the workforce resulting in the loss of such employer-funded benefits, many workers have started to fund their own retirement savings plans. Tax laws have enabled workers to realize tax benefits from deferring their income by putting amounts from their paychecks into such retirement savings plans. Increasingly, such employee-self-funded retirement savings plans are becoming the primary sources of income on which employees survive following retirement.

However, one disadvantage of the increased reliance upon employee-self-funded retirement savings is that these plans do not provide a level of retirement income that is guaranteed for the employee. In addition, many employees do not have any idea of an amount required to be saved in order to achieve a desired level of income to ensure a comfortable lifestyle upon their retirement. Thus, they do not contribute a sufficient amount of their salaries towards such retirement savings to provide an adequate income level to maintain the standard of living they desire upon retirement. Based on the results of the Retirement Confidence Survey sponsored by the Employee Benefits Research Institute (EBRI), the American Savings Education Council (ASEC), and Matthew Greenwald and Associates, 22 percent of all employed adult workers have saved less than $10,000 towards retirement, 50 percent have saved less than $50,000 and only 25 percent of adult workers over the age of 55 have accumulated more than $100,000.

Retirement income needs may increase in the event such retirees suffer from health-related problems. In fact, many employees today express concern that they will not have adequate funds saved to provide for themselves during their retirement in the event they suffer health-related problems after they retire. They are currently seeking some means to ensure a higher level of income saved for such crises.

Employees often do not participate in their employer-sponsored retirement savings plans, which will increase the level of their savings through interest income or a return on investment. Also, many individuals lack the sophistication needed to determine the appropriate type of investment vehicle which will offer them a high return on their investment but which is also secure enough so that their savings are not placed at risk by a high-risk type of investment vehicle.

However, there are a wide variety of benefit products available to an interested individual. For purposes of explanation, available benefit products may take the form of an annuity, or an "annuity structure", or a "mutual fund with an insurance guarantee". With regard to an annuity, an annuity might be characterized as a contract in which an individual or other entity agrees to pay a premium, in the form of periodic payments or a lump sum, to an insurance company or other issuing entity. The time period in which these premiums are paid may be characterized as an "accumulation phase". In exchange for the payment of the premiums, the individual or other entity receives a stream of income from the insurance company over a period of time. The period of time in which this stream of income is received may be characterized as the "payout phase". The payout phase might be a set number of years or life, for example.

However, there are limitations with known benefit products. It is desirable to reduce the uncertainty associated with a benefit product, particularly where the benefit product is provided by only one provider. It may be prudent, if not necessary, for the benefit product to be provided by multiple providers as a means to diversify exposure. The systems and methods of the invention address these desirabilities, as well as others.

BRIEF SUMMARY OF THE INVENTION

A computer implemented method and system that implements a benefit product that provides a guaranteed income amount for a participant, the benefit product generates the guaranteed income amount by participating in a plurality of guaranteed income products (GI products). The system may comprise: (1) an income aggregator portion; (2) a savings recordkeeper portion that maintains an investment account associated with the benefit product, the investment account into which the payments to the benefit product pass; and (3) at least one income recordkeeper portion, each income recordkeeper portion administering one or more GI products, each income recordkeeper portion: determining, based on an attributable allocation to a particular GI product, a guaranteed income associated with such particular GI product, each guaranteed income being an amount, attributable to the particular GI product, that is payable to a participant. The income aggregator performs allocation processing, the allocation processing being performed based on funds transfer data, the funds transfer data including (1) first funds transfer data that reflects activity of the investment account and benefit product associated therewith, and (2) second funds transfer data that reflects activity of a respective GI product.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of the inventive systems and methods in accordance with various embodiments of the invention will be described. As used herein, any term in the singular may be interpreted to be in the plural, and alternatively, any term in the plural may be interpreted to be in the singular. The systems and methods of the invention are directed to the above stated limitations, as well as other limitations, that are present in known products.

The innovation described herein relates to, and provides the technical effect of offering a system that affords in a plan, an income aggregator interfacing with a savings recordkeeper to implement a benefit product with a guaranteed income feature that is invested across a plurality of GI products.

Hereinafter, various aspects of the systems and methods of the invention will be described. In accordance with one aspect of the invention, the structure of the invention provides a benefit product that provides an annual guaranteed income. The benefit product provides the guaranteed income amount by participating in a plurality of GI products that are provided by one or more entities. The aggregate of the benefit provided, and other valuations such as excess withdrawals and fees charged, for example, is proportionally aggregated across the GI products based on protocols, as described below. For example, the benefit product may be in the form of a "retirement income guarantee", i.e., a guarantee associated with a retirement date.

As explained herein, the invention is illustratively described as providing annual guaranteed income, what is herein referred to as an "annual guaranteed income", as well as utilizing a guaranteed "annual" income factor. However, it is appreciated that the invention does not need to be implemented on an annual, i.e., yearly basis. The invention might be implemented on a monthly basis, or utilize any other periodicity. However, the invention will typically rely on some frequency as determined by the attributes of the particular product. For example, factor tables used in the invention are typically coordinated by some frequency. Further, it is noted that payments may be made at any desired frequency, as agreed upon by the parties.

Figure 1:
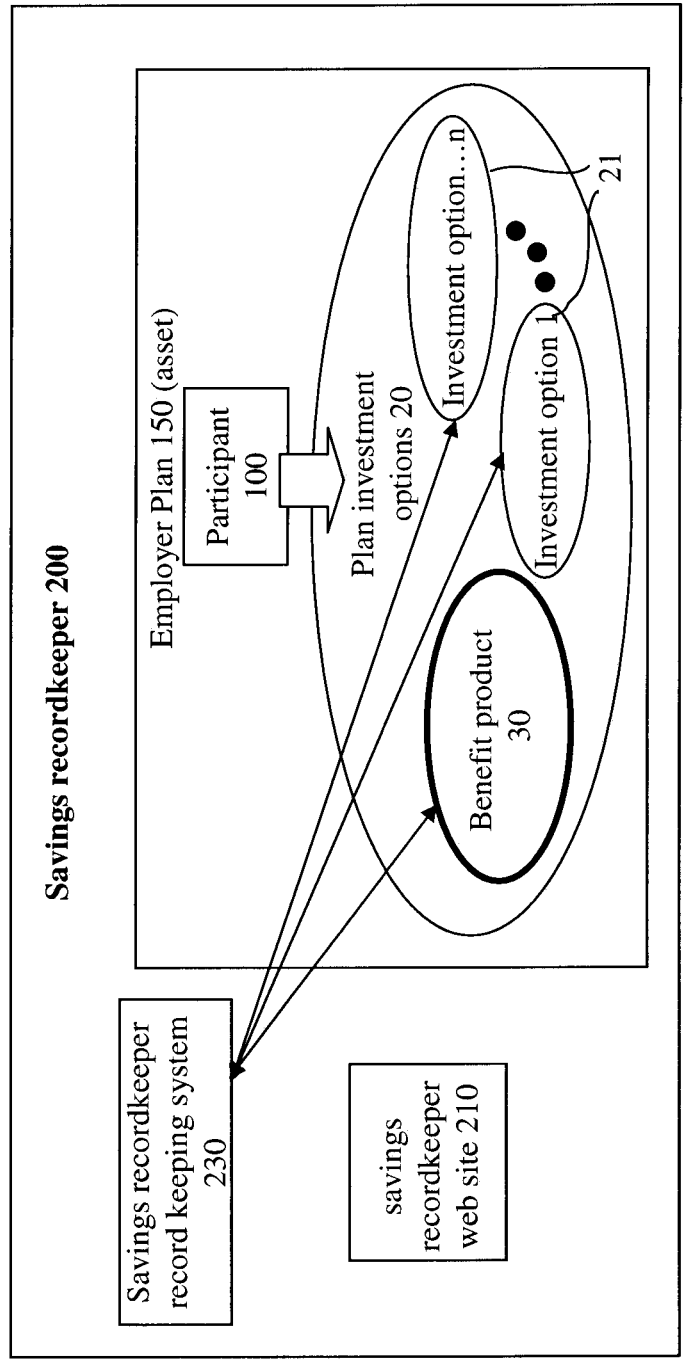
FIG. 1 is a block diagram showing a benefit product as a plan investment option among multiple plan investment options, such plan investment options recordkept by a savings recordkeeper recordkeeping system, in accordance with one embodiment of the invention.

FIG. 1 is a block diagram showing aspects of a benefit system 10 in accordance with one embodiment of the invention. The employer plan 150 owns multiple plan investment options 20, one of which is a benefit product 30. The main accounting system to support the benefit system 10 is maintained in part by a savings recordkeeper record keeping system 230.

The benefit system 10 includes an asset, such as an employer plan 150, in accordance with one embodiment of the invention. For example, the employer plan 150 might be in the form of a tax qualified plan. In accordance with one embodiment of the invention, the benefit product 30 is funded by payments from the employer plan 150 on behalf of a representative participant 100. Funding may also come directly from the participant 100. As should be appreciated, the benefit system 10 of the invention may be used by a substantial number of participants 100 associated with a particular employer plan 150.

As described herein, the asset 150 may be in the form of an employer plan 150. However, the invention is not limited to such asset. Indeed, any of a wide variety of assets may be utilized in the arrangement of the invention, as described below.

In further explanation of FIG. 1, the employer plan 150 includes a plurality of plan investment options 20. In accordance with one embodiment of the invention, one of those plan investment options 20 is the benefit product 30 of the invention. The benefit product 30 is the investment option, which the participant 100 selects, to secure an annual guaranteed income. The participant 100 may of course invest in other plan investment options 21. However, those other investment options 21 are not associated with an annual guaranteed income in this example.

Figure 2:
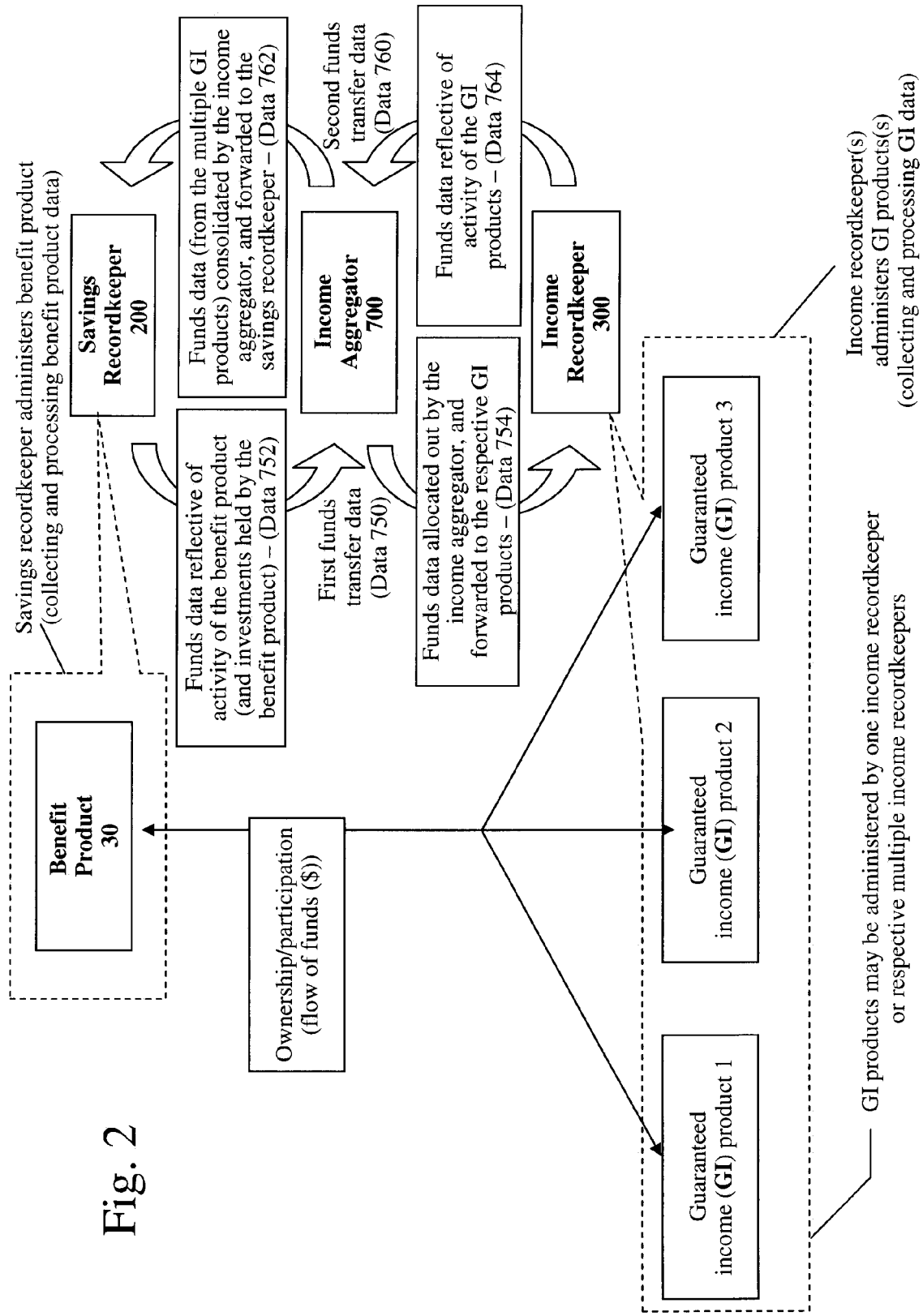
FIG. 2 is a diagram showing, relative to the benefit product, processing performed by and information shared between the savings recordkeeper, the income aggregator, and the income recordkeepers, in accordance with one embodiment of the invention.

FIG. 2 represents only the benefit product 30 owned by an employer plan. Within the benefit product 30, FIG. 2 is a diagram showing processing performed by the income aggregator 700 (as described herein), associated transfer of funds, associated transfer of data, and related aspects, in accordance with one embodiment of the invention.

As shown in FIG. 2, a benefit product 30 participates in a plurality of GI products (1-3). In the life of the benefit product 30 and GI products, funds flow back and forth there between. Hand in hand with such flow of funds are what might be loosely characterized as score-keepers. Such score keepers are the savings recordkeeper 200, the income recordkeeper(s) 300, as well as the income aggregator 700. Funds do not pass through such entities, in accordance with one embodiment of the invention. Rather, such entities perform processing so as to dictate how the funds should be transferred.

To further explain, data regarding the benefit product 30 (i.e., first funds transfer data) is passed by the savings recordkeeper 200 down to the income aggregator 700, processing is performed on such first funds transfer data by the income aggregator 700, and allocated first funds transfer data is passed from the income aggregator 700 to a participating income recordkeeper 300. The income recordkeeper 300 then performs processing of the allocated first funds transfer data as appropriate.

On the other hand, data regarding a particular GI product (i.e., second funds transfer data) is passed from the income recordkeeper 300 to the income aggregator 700, processing is performed on such second funds transfer data by the income aggregator 700, and consolidated second funds transfer data is passed from the income aggregator 700 to the savings recordkeeper 200. The savings recordkeeper 200 then performs processing of the consolidated second funds transfer data as appropriate.

Thus, in other words, in performing such processing, the income aggregator 700 routinely does one or both of: (1) allocates data of activity of a benefit product (in a savings recordkeeper 200) out to GI products that participate in such benefit product, and (2) allocates, i.e., consolidates, data of activity of a particular GI product (in an income recordkeeper 300) to the savings recordkeeper 200 that holds a benefit product that participates in such GI product.

The savings recordkeeper 200, income recordkeeper 300 and income aggregator 700 may well be disposed in and maintained by three unaffiliated entities. However, on the other hand, each of the savings recordkeeper 200, income recordkeeper 300 and income aggregator 700 might be disposed in the same entity. However, relatedly, it is further appreciated that such an arrangement does not necessarily deal with single entity vertical integration of multiple of its products, but rather may deal with other arrangements.

The benefit system 10 may be provided with communication interfaces so as to allow the various components of the benefit system to communicate with each other. Thus, such communication interface may be provided to allow the savings recordkeeper 200, the income recordkeeper 300 and/or the income aggregator 700 to communicate with each other and/or components within the components (200, 300, 700) to communicate with each other, for example. The communication interface might be in the form of a network, intranet or Internet connection, for example, or any other suitable form of communication network.

As shown in FIG. 2, in operation of the benefit system 10, the savings recordkeeper 200 outputs data to the income aggregator 700 regarding participant inflows to the benefit product, for example, or some other activity of the benefit product. The income aggregator 700 then processes the data from the savings recordkeeper 200 based on protocols, as described herein. Processed data, i.e., allocated data, is then passed on to the particular income recordkeeper 300, to which the data pertains. That is, data may be allocated out to each of the income recordkeepers that participates in the particular benefit product In a reverse manner, data relating to activity in a GI product is output from the particular income recordkeeper 300 (handling the GI product) to the income aggregator 700. The income aggregator 700 processes (based on protocols) such data from the income recordkeeper 300, and outputs the resulting processed data to the savings recordkeeper 200, which maintains the benefit product that is associated with the particular GI product (from which the data originated).

The transmission of the data might be performed between the portions (200, 300 and 700) in a batched periodic manner. Alternatively, the data might be input in real time, i.e., at essentially the same time as the data is updated in the savings recordkeeper record keeping system 230.

Figure 3:
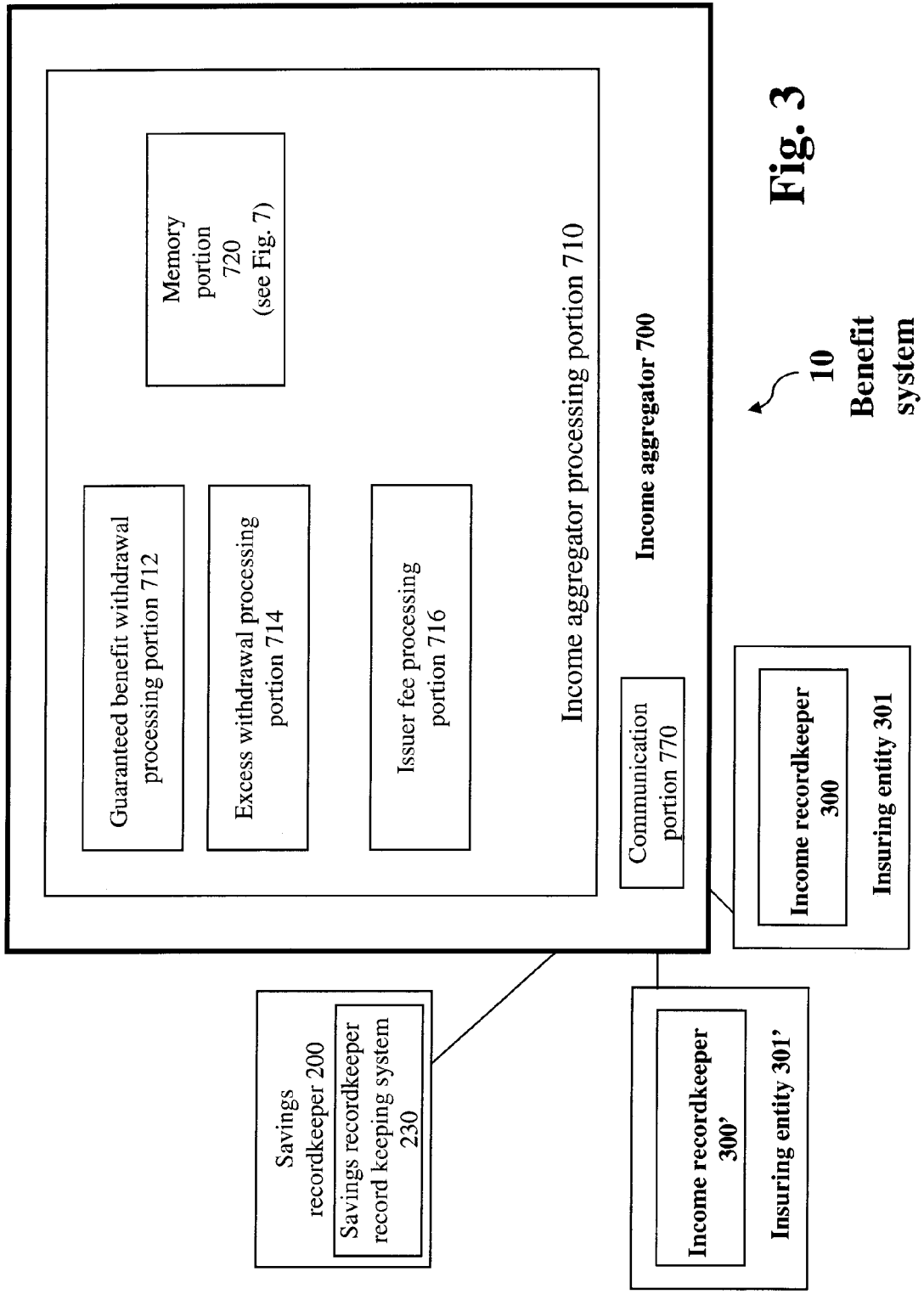
FIG. 3 is a block diagram showing the income aggregator of FIG. 2 in further detail in accordance with one embodiment of the invention.

As shown in FIG. 3, in the benefit system 10 various data from the savings recordkeeper record keeping system 230 is output to the income aggregator 700, processed by the income aggregator 700, and the allocated data (i.e., allocated for a particular income recordkeeper 300) is output to such particular income recordkeeper record keeping system 330 to which the data is attributable. In practice of the invention, it is generally indeed needed that the savings recordkeeper 200 generate extracts from the data structure (maintained in the savings recordkeeper record keeping system 230) and output those data extracts to the income aggregator 700. However, it is envisioned that such output of data from the savings recordkeeper record keeping system 230 to the income aggregator 700 will cause minimal if any disruption to operations of the savings recordkeeper 200. Further, in accordance with one embodiment of the invention, the savings recordkeeper 200 performs no modification of the data (in the savings recordkeeper record keeping system 230) prior to sending that data to the income aggregator 700, but rather simply bundles that data in some suitable manner prior to forwarding to the income aggregator 700. The communication portion 770, as shown in FIG. 3, performs any needed conversion/modification of the data received from the savings recordkeeper record keeping system 230, i.e., from the savings recordkeeper 200, as well as from the income recordkeeper 300.

Figure 4:
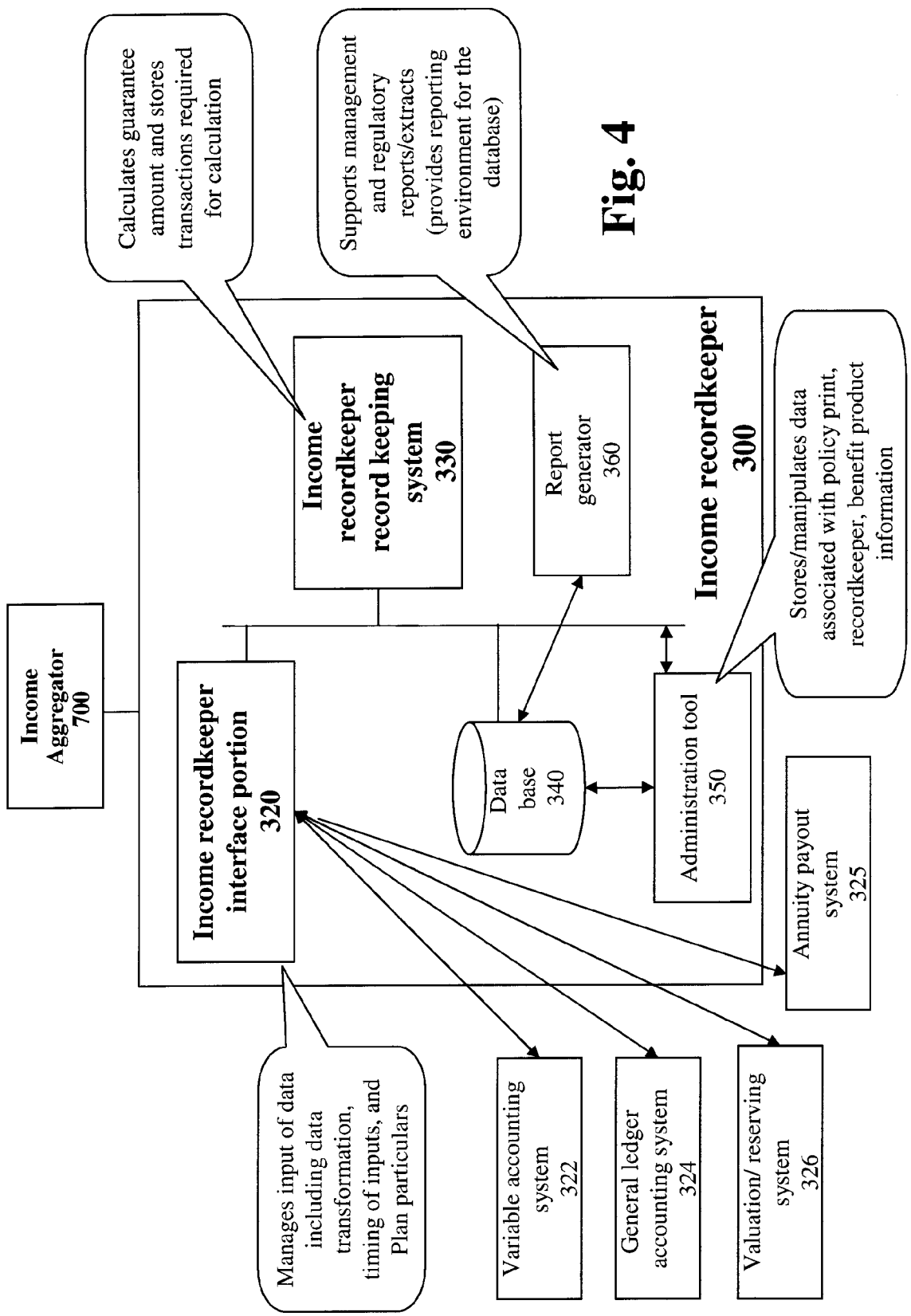
FIG. 4 is a block diagram showing further details of the income recordkeeper of FIG. 2 in accordance with one embodiment of the invention.

As shown in FIG. 4, the income recordkeeper 300 also includes a database 340. The database 340 may support a wide variety of data needs of the income recordkeeper 300 associated with implementation of the inventive benefit product. The income recordkeeper 300 further includes an administration tool 350 and a report generator 360. Further details of the administration tool 350 and the report generator 360 are discussed below.

The income recordkeeper record keeping system 330 performs a variety of processes as described herein. In accordance with one embodiment of the invention, the income recordkeeper record keeping system 330 monitors payments paid, by a participant, to the respective GI product via the particular benefit product 30. The income recordkeeper record keeping system 330 determines, based on the payments, an annual guaranteed income associated with payments into the respective GI product via the benefit product 30. The annual guaranteed income is an amount that will be paid to the participant after a future start date, i.e., marking the end of the accumulation phase.

Hereinafter, further aspects of the capabilities of the income recordkeeper 300 will be described. The income recordkeeper, and specifically, the income recordkeeper record keeping system 330 in accordance with one embodiment of the invention, is provided with the capability to maintain participant level records for the benefit product 30. This in turn allows tracking of a participant's income guarantee, for example In order to accurately monitor the annual guaranteed income associated with the benefit product 30, each income recordkeeper tracks the amount of annual guaranteed income purchased on behalf of a participant with each contribution to the benefit product 30, as adjusted for any withdrawals (or other adjustments) attributable to that particular income recordkeeper 300. In the benefit system 10 in accordance with one embodiment of the invention, the income recordkeeper 300 is not responsible for any of the regulatory, compliance or tax reporting issues related to the plan. Rather, that responsibility lies with the savings recordkeeper 200. However, the income recordkeeper effects operation of the income recordkeeper record keeping system 330 and the implementation of the benefit product associated with the annual guaranteed income for that particular income recordkeeper 300. Further, a particular income recordkeeper 300 is not responsible for, nor privy to, data relating to other income recordkeepers 300. Rather, the income aggregator 700 allocates funds and the associated data relating to those GI products, between the various income recordkeepers 300 that are involved in a particular GI product for a particular participant.

As described herein, monies paid into the benefit product 30 during the accumulation phase on behalf of a participant 100 are tracked by the savings recordkeeper 200, and allocated by the income aggregator 700 to the GI products and tracked by the respective income recordkeeper(s) 300. As a result of such monies paid into the benefit product 30, the participant 100 receives annual guaranteed income. In order to calculate the income guarantee amount (by the income recordkeeper 300), separate guaranteed annual income factors are established for each age, as determined by the benefit product, within the particular plan's eligible age range, in accordance with one embodiment of the invention. The guaranteed annual income factor by age is the result of a calculation that may take into account a variety of factors. For example, these factors may include the specified start age when income payments are assumed to commence (e.g., a retirement age), the payout form of income payments (e.g. life with 20 years period certain), a mortality guarantee during the payout phase that is tied to the current age for which the guaranteed annual income factor is being determined, and an interest rate that varies with the number of years until annual income payments are assumed to begin, for example. However, other factors may of course be considered as is desired. The guaranteed annual income factors, for each plan, may be applied utilizing a factor table, in accordance with one embodiment of the invention. For example, the factor table may list a contribution age of a participant vis-à-vis the particular guaranteed annual income factor that is associated with that contribution age. It is appreciated that a table per se need not be used. That is, other equivalent processing methodologies might also be used.

Accordingly, in one embodiment of the invention, each dollar contribution made by a participant 100 will purchase a dollar amount of guaranteed annual income as adjusted by applying the guaranteed annual income factor for the applicable age (as defined by the benefit product, herein referred to as "age") at which the contribution was made. The guaranteed annual income factor for an age is applied to all contributions made by or on behalf of the participant 100 while the participant is at that specified age. Once the age of the participant changes, as determined by the benefit product, the guaranteed annual income factor will adjust accordingly. The total amount of annual guaranteed income that has been purchased for the participant, as adjusted for withdrawals over his years of participation in the plan, becomes the annual guaranteed income benefit for the participant.

Hereinafter, further aspects of the inventive systems and methods will be described. As shown in FIG. 2 and described herein, the benefit product 30 includes the savings recordkeeper 200 and the income recordkeeper 300, as well as the income aggregator 700 that is disposed there between. The savings recordkeeper 200 may communicate with a participant 100, who participates in the benefit product 10. This communication may be performed over a suitable communication interface, as discussed herein, in accordance with one embodiment of the invention. The communication interface might be in the form of the Internet, intranet, or some other network arrangement, for example.

So as to effect this communication with a participant 100, the savings recordkeeper 200 includes a savings recordkeeper web site 210, as shown in FIG. 1. The savings recordkeeper web site 210 allows participants 100 access to various data that is maintained by the savings recordkeeper 200. In particular, the savings recordkeeper web site 210 provides access to information relating to the benefit product held by a participant 100, as well as other plan investment options 20, which are available to the participant 100.

Access by the participant 100 via the savings recordkeeper web site 210 may be controlled in any known manner, i.e., such as by the use of usernames and passwords, for example. However, it should be appreciated that the particular arrangement of a web site is not required for implementation of the benefit system 10. That is, any suitable communication interface might be used to allow the participant 100 to interact with the savings recordkeeper 200. For example, possible delivery mechanisms include mailed reports and telephone.

The income aggregator 700 may also be provided with an interface so as to allow a participate or other individual, e.g. an administrator, to view data being processed by the income aggregator 700. In particular, such interface would allow an administrator to monitor the various allocations being performed by the income aggregator 700.

Additional aspects of embodiments of the invention will hereinafter be described with further reference to FIG. 4.

As discussed above, the income recordkeeper interface portion 320 is provided in the income recordkeeper 300 to handle the input of data from the income aggregator 700. In particular, the income recordkeeper interface portion 320 may manage input of data including data transformation, timing of inputs, and company particulars. The income recordkeeper interface portion 320 may input a variety of other data as needed, and interface with the income recordkeeper record keeping system 330 so as to use the data in operation of the benefit system 10.

Further, as shown in FIG. 4, it is appreciated that the income recordkeeper interface portion 320 may be in communication with other systems so as to input needed data from the other systems. That is, for example, the income recordkeeper interface portion 320 may be in communication with a variable accounting system 322, a general ledger accounting system 324, an annuity payout system 323 (in the case that the benefit product 30 is an annuity), and/or an actuarial valuation and reserving system 326, for example.

The income recordkeeper 300 also includes the administration tool 350. Illustratively, the administration tool 350 may store and/or manipulate data associated with the printing of a policy, particulars of a savings recordkeeper, and/or various product information In accordance with one embodiment of the invention, the income recordkeeper 300 also includes a report generator 360. The report generator 360 is in communication with the database 340 so as to provide a variety of report generation and processing. For example, the report generator 360 supports management and regulatory reports/extracts. In general, the report generator 360 provides for a reporting environment for the database 340. As described herein, the database 340 may contain any of a wide variety of data used in the income recordkeeper 300, and the report generator 360 may report out that information as needed.

Figure 5:
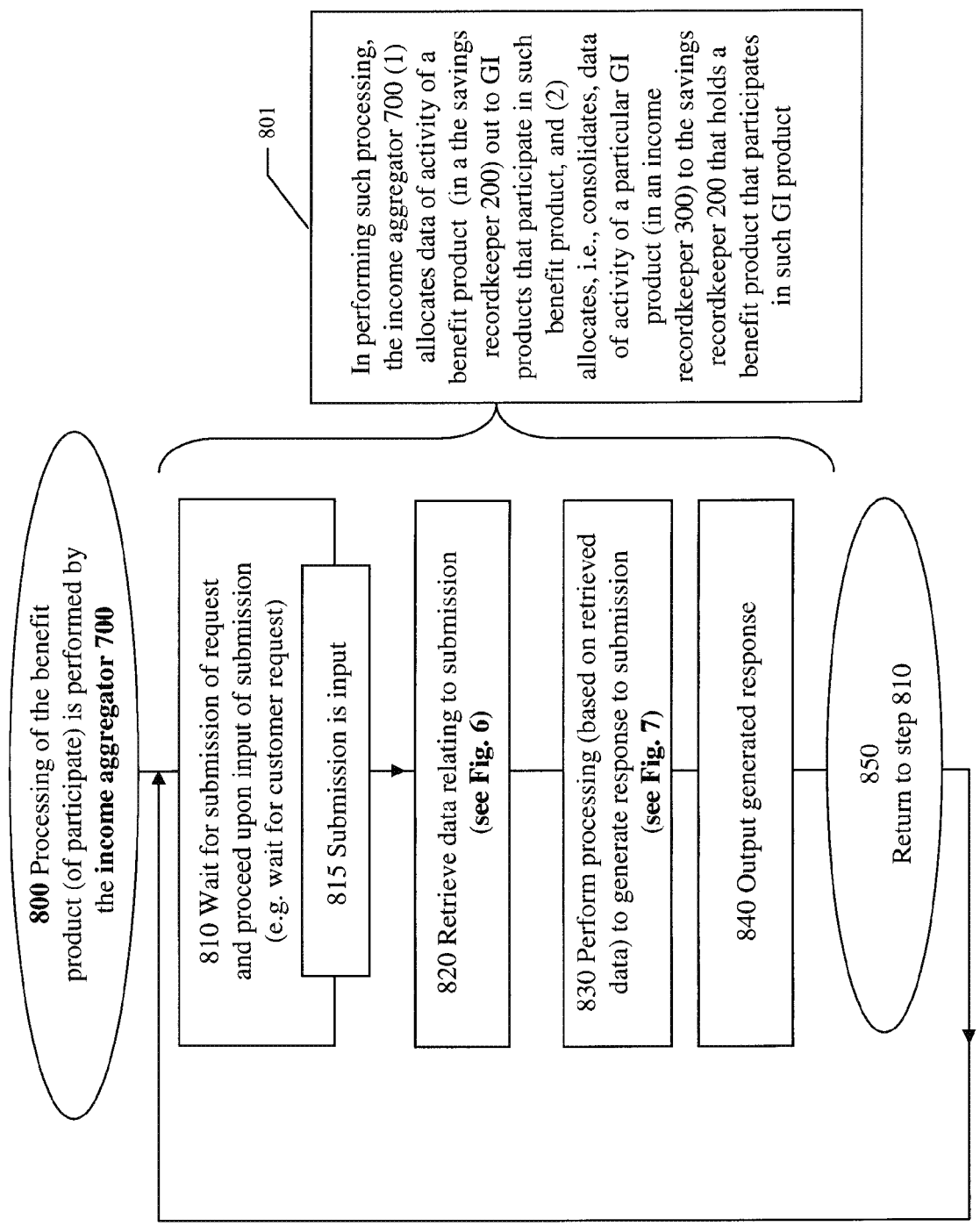
FIG. 5 is a flowchart showing processing performed by the income aggregator in accordance with one embodiment of the invention.

FIG. 5 is a flowchart showing processing performed by the income aggregator 700 in accordance with one embodiment of the invention.

As shown in FIG. 5, the below described processing of steps 810-840 is performed in conjunction with the processing of step 801, as needed. That is, in step 801, the income aggregator 700 performs one or both (1) allocates data of activity of a benefit product (in a the savings recordkeeper 200) out to GI products that participate in such benefit product, and (2) allocates, i.e., consolidates, data of activity of a particular GI product (in an income recordkeeper 300) to the savings recordkeeper 200 that holds a benefit product that participates in such GI product. FIG. 2, as discussed above, shows further aspects of such processing.

As shown in FIG. 5, the process starts in step 800 and passes to step 810.

In step 810, the process waits for the submission of a request, and proceeds upon input of a submission. The request might be for a payment of a guaranteed benefit, a payment in excess of a guaranteed benefit, and/or the payment of a fee to an income recordkeeper 300, i.e., an insurer. Thus, step 815 reflects that a submission of a request is input.

Figure 6:
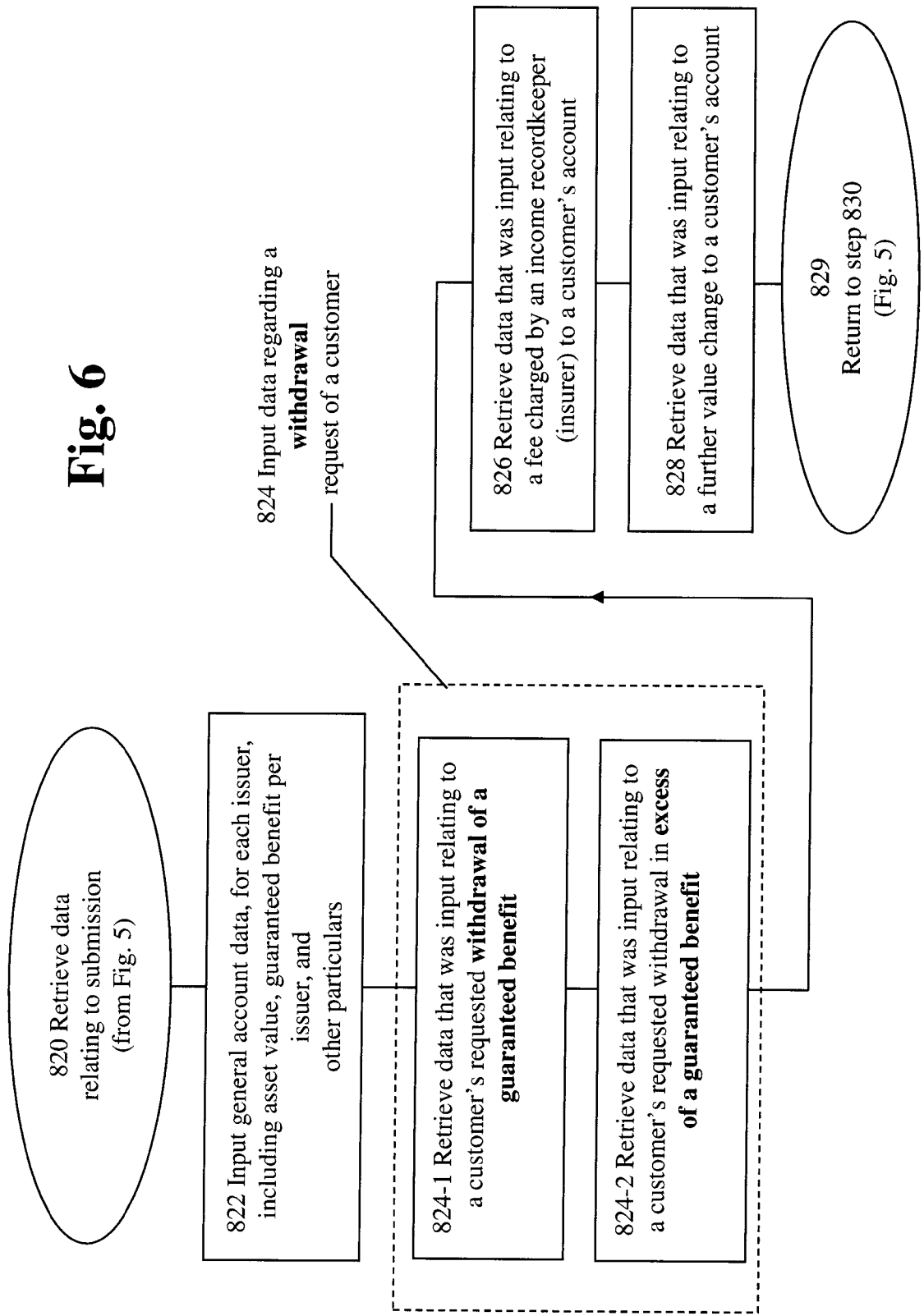
FIG. 6 is a flowchart showing the "retrieve data relating to submission" step of FIG. 5 in further detail.

Accordingly, after step 815, the process passes to step 820. In step 820, in order to process the request, the income aggregator 700 retrieves data relating to request. Further details of such processing are shown in FIG. 6.

Figure 7:
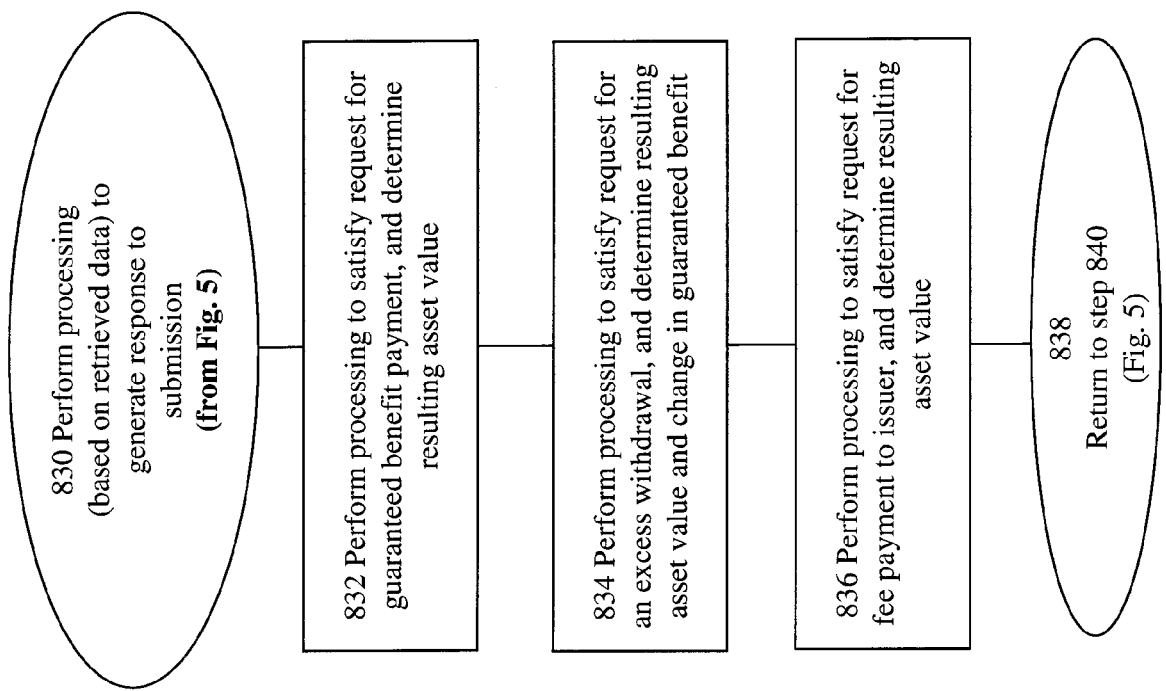
FIG. 7 is a flowchart showing the "perform processing (based on retrieved data) to generate response to submission" step of FIG. 5 in further detail, in accordance with one embodiment of the invention.

After step 820 of FIG. 5, the process passes to step 830. In step 830, the income aggregator 700 performs processing, based on the retrieved data, so as to generate a response to the submission. Further details of such processing are shown in FIG. 7.

After step 830 of FIG. 5, the process passes to step 840. In step 840, the income aggregator 700 outputs the generated response. For example, the income aggregator 700 may output the generated response to the income recordkeeper 300, and/or the savings recordkeeper 200.

After step 840, the process passes to step 850. In step 850, the process returns to step 810 of FIG. 5. That is, the processing, as performed by the income aggregator 700 in accordance with one embodiment of the invention, returns to step 810 and waits for the receipt of a further request.

FIG. 6 is a flowchart showing the "retrieve data relating to submission" step of FIG. 5 in further detail, in accordance with one embodiment of the invention. As shown, the process starts in step 820, and passes to step 822. In accordance with one embodiment of the invention, the processing of FIG. 6 may be performed by the income aggregator 700.

In step 822, the income aggregator 700 inputs general account data, for each issuer (i.e., for each income recordkeeper 300), including asset value, guaranteed benefit per issuer, and other particulars. After step 822, the process passes to step 824.

In step 824, the income aggregator 700 inputs data regarding a withdrawal request of a customer. As reflected in FIG. 6, such a withdrawal request by a customer may be constituted by two processing steps. That is, in step 824-1, the income aggregator 700 may retrieve data that was input relating to a customer's requested withdrawal of a guaranteed benefit, and/or in step 824-2, the income aggregator 700 may retrieve data that was input relating to a customer's requested withdrawal in excess of a guaranteed benefit. Such components of a withdrawal may be delineated in the request (i.e., the customer may delineate the respective withdrawals). However, alternatively, the customer might simply provide a requested withdrawal amount, in which case the income aggregator 700 and/or the income recordkeeper 300 may determine if such requested withdrawal may be attained via the guaranteed benefit or whether an excess withdrawal is required.

After step 824, the process passes to step 826. In step 826, data is retrieved relating to a fee that was charged by an income recordkeeper 300, i.e., charged by an insurer. Then, in step 828, the income aggregator 700 retrieves data that was input relating to a further value change to a customer's account. For example, the data of step 828 may reflect a change in assets of the customer in the savings recordkeeper 200, as a result of appreciation of such assets.

After step 828, the processing passes to step 829. In step 829, the process returns to step 830 of FIG. 5.

FIG. 7 is a flowchart showing the "perform processing (based on retrieved data) to generate response to submission" step 830 of FIG. 5 in further detail, in accordance with one embodiment of the invention. As shown, the process of FIG. 7 starts in step 830, and passes to step 832.

In step 832, the income aggregator 700 (in accordance with one embodiment of the invention) performs processing to satisfy a request for a guaranteed benefit payment, and determines a resulting asset value. In step 834, the income aggregator 700 performs processing to satisfy a request for an excess withdrawal, and determines a resulting asset value and change in guaranteed benefit, i.e., as a result of such excess withdrawal.

After step 834, the process passes to step 836. In step 836, the income aggregator 700 performs processing to satisfy a request for a fee payment to an issuer (i.e., an income recordkeeper 300), and determines a resulting asset value as a result of payment of such fee.

In accordance with one embodiment of the invention, any one or all of steps 832, 834 and 836 may be performed by the income aggregator 700, in response to a particular request.

After step 836 of FIG. 7, the process passes to 838. In step 838, the process returns to step 840 of FIG. 5.

In the processing of steps 832, 834 and 836, various protocols, i.e., rules, may be used by the income aggregator 700. In particular, the value of guaranteed benefit may be computed by the income aggregator 700 based on respective issuer's guarantee, and not on asset value. On the other hand, excess withdrawals, i.e., those withdrawals in excess of the guaranteed benefit, may be computed by the income aggregator 700 based on account value, and not on the guaranteed benefit.

Hereinafter, examples of various aspects of computation, which may be performed by the income aggregator 700, are set forth below.

Example 1 describes an excess withdrawal in a single issuer model, in which one instance of a guaranteed benefit, a Guaranteed Lifetime Withdrawal Benefit (GLWB), is reduced by one minus the quotient of the excess withdrawal over the account value immediately prior to the excess withdrawal.

Example 1

AV (account value): $100

Guaranteed Lifetime Withdrawal Amount (GLWA): $7.50

Participant takes full $7.50 withdrawal against GLWA, lowering AV to $92.50.

Participant then withdrawals $10.00 excess withdrawal.

GLWA is reduced by the following formula ((1−(10.00/92.50))*7.50

Thus, the post-excess withdrawal results in a GLWA of $6.69.

Various ways may be provided to process withdrawals in a multi-manager environment, as described herein, which may or may not result in the sum of the issuers' benefits equaling the benefit at the benefit product level. Two further examples that yield different results are:

Example 2

Allocate excess withdrawal by per-issuer benefit (same as non-excess withdrawals)
Issuer 1 has a $50.00 AV and a $5.00 GLWA.
Issuer 2 has a $50.00 AV and a $2.50 GLWA
Total AV $100.00; total GLWA $7.50
Participant takes full $7.50 withdrawal against GLWA
Issuer 1 bears 66.7% of the withdrawal, or $5.00
Issuer 2 bears 33.3% of the withdrawal, or $2.50
Post-withdrawal, issuer 1 has $45.00 AV, issuer 2 has $47.50 AV
Participant then elects $10.00 excess withdrawal; issuer 1 bears $6.67 and issuer 2 bears $3.33.
Issuer 1's remaining AV is $38.33 and issuer 2's remaining AV is $44.17.
Issuer 1's GLWA is now $4.26 and issuer 2's GLWA is now $2.32, adding to $6.58, different from $6.69 in Example 1.
Protocol fine if there is no excess withdrawal computation at the benefit product level.

Example 3

Allocate excess withdrawal by per-issuer AV
Same particulars as above
Participant elects $10.00 excess withdrawal; issuer 1 bears $4.86 and issuer 2 bears $5.14
Issuer 1's remaining AV is $40.14 and issuer 2's remaining AV is $42.36
Issuer 1's GLWA is now $4.46 and issuer 2's GLWA is now $2.23, adding to $6.69, equal to $6.69 in Example 1

In accordance with one embodiment of the invention, as rules are imposed at the benefit product level (such as excess withdrawals done as noted in Example 1) and have that result equal the sum of the issuers' guarantees, excess withdrawals at the issuer level should be on the account value, not on benefit, in accordance with one embodiment of the invention. Further, in accordance with one embodiment of the invention, normal withdrawals (up to the annual guarantee) may be allocated across issuers' guarantee, not account value.

Hereinafter, various further aspects of embodiments of the invention will be described.

In accordance with one embodiment of the invention and as discussed above, the income aggregator processing portion 710 provides an adaptable and extensible interface format capable of accepting the many different data formats established by plans 150 and savings recordkeepers 200, without requiring major updates of software each time a new format or protocol is encountered. Data formats and schedule information specific to each employer plan and savings recordkeeper are recorded in a series of tables maintained by the software application. With the approach of this implementation, the change needed to add a new employer plan is a simple addition of plan specific information to the appropriate table. In one embodiment of the invention, the change for a new savings recordkeeper will thus include adding a record definition to the appropriate table and making a new entry in the scheduling table.

It is appreciated that various algorithms may be used in conjunction with the various processing of the invention. The particular algorithms used may well vary widely depending on a wide variety of factors, such as actuarial analysis, risk tolerance and/or other factors as discussed herein, as would be appreciated by the one of ordinary skill in the art.

It is noted that the invention has been described above in the general context of a savings recordkeeper interfacing with multiple income recordkeepers through an income aggregator. It should be appreciated that implementation of the invention may include any of a variety of savings recordkeepers. That is, any of a variety of savings recordkeepers might be utilized to effect the role of "savings recordkeeper" as described herein, including but not limited to a plan sponsor, plan administrator, third party administrator, insuring entity or other competent party.

The implementation of the invention as described above is extremely flexible with the ability to accommodate multiple annuity types, different underlying or multiple investment funds, single or joint annuitants, qualified or non-qualified plan types, and/or other benefit products, for example. That is, while the invention has been described with reference to an annuity, it is appreciated that the invention might be used with any of a wide variety of benefit products. U.S. patent application Ser. No. 11/065,441 filed Feb. 25, 2005; U.S. patent application Ser. No. 09/876,053 filed Jun. 8, 2001, now U.S. Pat. No. 7,398,241; U.S. patent application Ser. No. 10/083,250 filed Feb. 27, 2002; U.S. patent application Ser. No. 11/239,485 filed Sep. 30, 2005; and U.S. Provisional Patent Application 60/614,589 filed Oct. 1, 2004 which are each incorporated herein by reference in their entirety, describe a variety of annuities, products, systems and methods that might be used in conjunction with the features of the present invention. Further, in general, any of the features described in the applications referenced herein may be used in conjunction with the features described herein.

The invention has been described herein with reference to an annual guaranteed income. However, it is appreciated that the guaranteed income associated with a particular benefit product 30 does not have to be dependent on an annual basis of payment. That is the product described herein (including the benefit product 30 with guaranteed income) may provide a guaranteed income based on any suitable periodic structure.

In further explanation of one aspect of the invention, the invention has been illustratively described above in the context that the benefit product 30 may be funded by payments from the employer plan 150 on behalf of the participant. However, in the invention, funds or monies may be paid into the benefit product 30 in any suitable manner. Accordingly, these payments might be characterized as payments, or contributions, or purchases, for example. Further, it is noted that generally payments are made by plan on behalf of participants. However, payments might in some situations be paid directly to the participant 100. This might be true with a rollover, where a participant rolls over money to a trustee, who makes the purchase on behalf of participant.

Also, it is noted that in FIG. 1, for example, the invention has been explained in the context of an employer plan 150. However, the systems and methods of the invention do not have to be implemented in an employer/employee situation. Rather, a plan of the invention might be implemented using some other group of affiliated persons, e.g., such as a trade group. Accordingly, the participant 100 does not necessarily have to be an employee. With regard to the group of affiliated individuals, the persons who are entitled to participate in the plan are mandated by plan eligibility rules.

In implementation of the benefit system as described herein, it is appreciated that the savings recordkeeper and the income recordkeeper need not have any particular type of affiliation or relationship to each other, either from a technical perspective or from a legal perspective, and as used herein, they may be "unaffiliated third parties," notwithstanding any other contractual relationships among the unaffiliated third parties which may exist for other business interests. Other business interests could include, for example, an income record keeper that also provides group life insurance to the savings recordkeeper, in which case the entities would still be considered unaffiliated third parties, as used herein. In an example where the entities would not be considered unaffiliated third parties, the income recordkeeper and the savings recordkeeper might be separate entities each owned by the same holding company or other legal structure.

Indeed, in accordance with one embodiment of the invention, the savings recordkeeper 200 and the income recordkeeper 300, as well as the income aggregator 700, may be included in one and the same entity.

In accordance with one embodiment of the invention, it is appreciated that the income recordkeeper record keeping system 330 (including the software and other components to provide the income recordkeeper record keeping system 330) might be housed, maintained and/or developed by a third party Such third party might be a software entity or some third party vendor, for example. Further, the income recordkeeper interface portion 320 and the database 340, for example, might be housed in such a third party. In such an arrangement (of the income recordkeeper interface portion 320, the income recordkeeper record keeping system 330, and/or the data base 340 housed in a third party), the third party would not be the income recordkeeper. That role would be assumed by an insuring entity. However, the third party would be providing and/or implementing the components of the income recordkeeper record keeping system used by the income recordkeeper. Accordingly, the third party might allow use of its income recordkeeper record keeping system, for example, to one or multiple insuring entities, such as via a license or otherwise. In a similar manner, the savings recordkeeper record keeping system 230 might be housed, maintained and/or developed by a third party As used herein, the term "data" has been used interchangeably with the term "information", and the term "information" has been used interchangeably with the term "data".

As described above, FIGS. 1, 2, 3 and 4 discussed herein show embodiments of a structure and system of the invention. Further, FIGS. 5, 6 and 7 show various steps of one embodiment of the method of the invention. It is appreciated that the systems and methods described herein may be implemented using a variety of technologies. Hereinafter, general aspects regarding possible implementation of the systems and methods of the invention will be described.

It is understood that the system of the invention, and portions of the system of the invention, may be in the form of a "processing machine," such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data, i.e., on a computer readable medium. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter, for example. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface may be utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system that implements a benefit product that provides a guaranteed income amount for a participant, the benefit product generates the guaranteed income amount by participating in a plurality of guaranteed income products (GI products), the system in the form of a computer processing system using computer-readable medium containing instructions stored thereon which when executed cause the computer processing system to perform processing, the system comprising:

an income aggregator portion, embodied in a tangible computer-readable medium;
a savings recordkeeper portion, embodied in the tangible computer-readable medium, that maintains an investment account associated with the benefit product, the investment account into which the payments to the benefit product pass; and
at least one income recordkeeper portion, embodied in the tangible computer-readable medium, each income recordkeeper portion:
determining, based on an attributable allocation to a particular GI product, a guaranteed income associated with such particular GI product, each guaranteed income being an amount, attributable to the particular GI product, that is payable to a participant; and
the income aggregator performing allocation processing, the allocation processing being performed based on funds transfer data, the funds transfer data including (1) first funds transfer data that reflects activity of the investment account and benefit product associated therewith, and (2) second funds transfer data that reflects activity of a respective GI product, the allocation processing including:
the income aggregator portion inputting the first funds transfer data;
the income aggregator portion determining allocations attributable to and among the GI products and outputting allocated first funds transfer data to the respective GI products;
the income aggregator portion receiving second funds transfer data reflective of the activity of respective GI products; and
the income aggregator portion consolidating the second funds transfer data, and outputting consolidated second funds transfer data.

2. The system of claim 1, the allocation processing further including the income aggregator portion inputting the first funds transfer data from a savings recordkeeper portion.

3. The system of claim 2, the allocation processing further including the income aggregator portion outputting the consolidated second funds transfer data to the savings recordkeeper portion.

4. The system of claim 1, the allocation processing further including the income aggregator portion outputting the consolidated second funds transfer data to a savings recordkeeper portion.

5. The system of claim 1, each income recordkeeper portion administering one or more GI products.

6. The system of claim 1, wherein each GI product is administered by a respective income recordkeeper portion; and
each respective income recordkeeper portion is in the form of one of an insurance company, a bookkeeping company, recordkeeping company, and a third party administrator; and
the savings recordkeeper portion, the income aggregator portion, and the income recordkeeper portion are each maintained by a respective different entity.

7. The system of claim 1, wherein the savings recordkeeper portion, the income aggregator portion, and the income recordkeeper portion is maintained by a single entity.

8. The system of claim 1, wherein the income aggregator portion outputs multiple respective allocated funds transfer data to a single income recordkeeper portion based on respective GI products that such single income recordkeeper portion administers; and the allocation processing of the funds transfer data, performed by the income aggregator portion, includes:
determining the allocation of participant values and transactions as recorded by the savings recordkeeper to the particular income recordkeeper.

9. The system of claim 1, wherein the allocation processing of the funds transfer data, performed by the income aggregator portion, includes:
determining the aggregation of participant values, available transactions, and income guarantees across income recordkeepers for the savings recordkeeper.

10. The system of claim 1, wherein the allocation processing of the funds transfer data, performed by the income aggregator portion, includes:
determining cash settlements between the benefit product and the GI products.

11. The system of claim 1, wherein the allocation processing, of the funds transfer data, includes allocation of fees and expenses associated with the GI products so as to allocate the fees and expenses due each GI product to the respective GI product.

12. The system of claim 11, wherein fees and expenses due each GI product are withdrawn from the respective GI product if fees and expenses are similar or different in rate among GI products.

13. The system of claim 11, wherein fees and expenses due each GI product are accrued by each respective GI product if fees and expenses are similar in rate among GI products.

14. The system of claim 1, wherein the allocation processing, of the funds transfer data, includes allocation of contributions and transfers into the benefit product from the GI products, such allocation of contributions and transfers into the benefit product being performed based on a schedule; and
wherein the allocation processing of the funds transfer data, includes aggregation of distributions and withdrawals from the GI products to the benefit product.

15. The system of claim 1, wherein the allocation processing, of funds transfer data, includes allocation of distributions and withdrawals from the benefit product up to and including each participant's guaranteed income amount is performed pro-rata on each participant's guaranteed income amount among the GI products; and the allocating processing of funds transfer data, including allocation of distributions and withdrawals from the benefit product is performed pro-rata on each participant's balance among the GI products; and the allocation processing, of funds transfer data, of distributions and withdrawals from the benefit product above each participant's guaranteed income amount is performed pro-rata on each participant's balance among the GI products.

16. The system of claim 1, wherein the allocation processing, of funds transfer data, of distributions and withdrawals from the benefit product above each participant's guaranteed income amount is performed pro-rata on each participant's balance among the GI products.

17. The system of claim 1, wherein the allocation processing, of funds transfer data, includes allocation of a benefit payment, due from each GI product, to the respective GI product; and the savings recordkeeper maintains an investment account for each participant without respect to any monetary balance in the investment account.

18. The system of claim 1, wherein the at least one income recordkeeper portion administering one or more GI products consists of one income recordkeeper administering a plurality of GI products.

19. The system of claim 1, wherein the at least one income recordkeeper portion administering one or more GI products comprises a plurality of income recordkeepers, each of whose administering consists of administering a single GI product.

20. A method that implements a benefit product that provides a guaranteed income amount for a participant, the benefit product generating the guaranteed income amount by participating in a plurality of guaranteed income products (GI products), the method implemented by a computer processing system using computer-readable medium containing instructions stored thereon which when executed cause the computer processing system to perform processing, the method comprising:
inputting first funds transfer data, by an income aggregator processing system, from a savings recordkeeper portion that maintains an investment account associated with the benefit product, the investment account into which the payments to the benefit product pass, the income aggregator processing system being in the form of a tangibly embodied processing portion;
inputting second funds transfer data, by the income aggregator processing system, from at least one income recordkeeper portion, each income recordkeeper portion administering one or more GI products, each income recordkeeper portion determining, based on an attributable allocation to a particular GI product, a guaranteed income associated with such particular GI product, each guaranteed income being an amount, attributable to the particular GI product, that is payable to a participant; and
performing allocation processing, the allocation processing being performed based on funds transfer data, the funds transfer data including (1) the first funds transfer data that reflects activity of the investment account and benefit product associated therewith, and (2) the second funds transfer data that reflects activity of a respective GI product, the allocation processing including:
inputting the first funds transfer data from the savings recordkeeper portion;
determining allocations attributable to and among the GI products;
outputting allocated first funds transfer data;
receiving the second funds transfer data reflective of the activity of respective GI products;
consolidating the second funds transfer data, and
outputting consolidated second funds transfer data.

* * * * *